J. M. LONGYEAR & J. T. JONES.
ORE REDUCING APPARATUS AND PROCESS.
APPLICATION FILED FEB. 23, 1915. RENEWED NOV. 2, 1918.
1,289,835.
Patented Dec. 31, 1918.
5 SHEETS—SHEET 5.
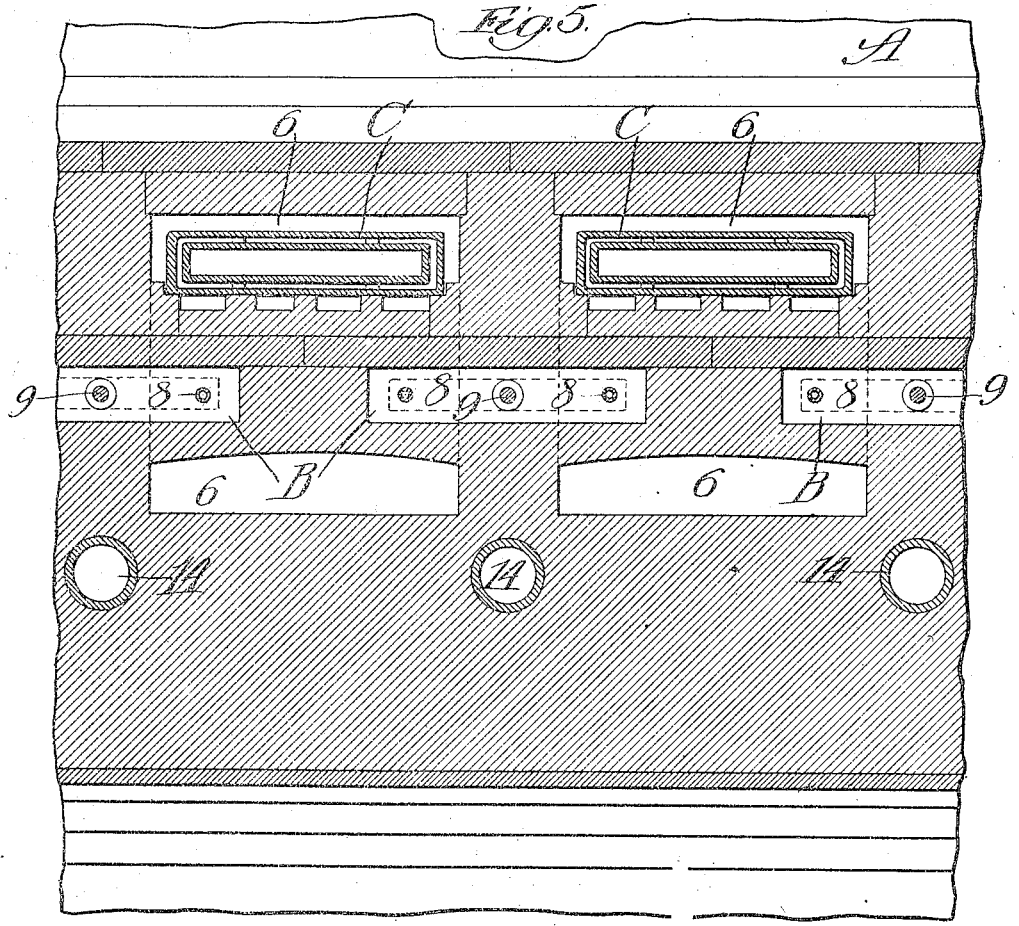
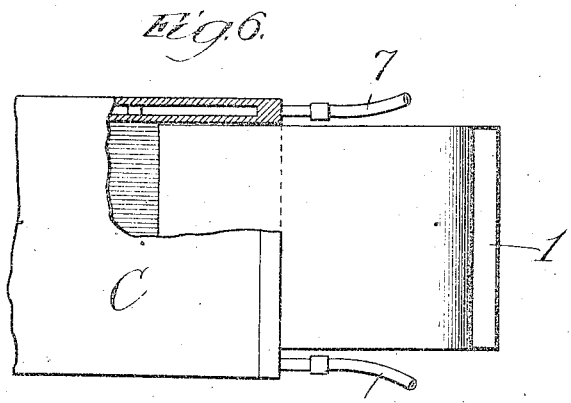
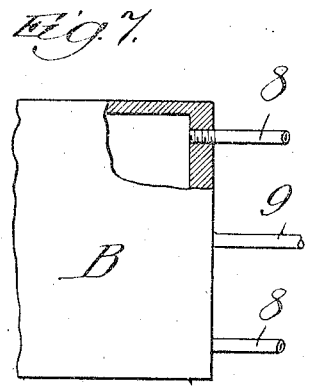
Witnesses:
Inventors:
John M. Longyear and
John T. Jones,

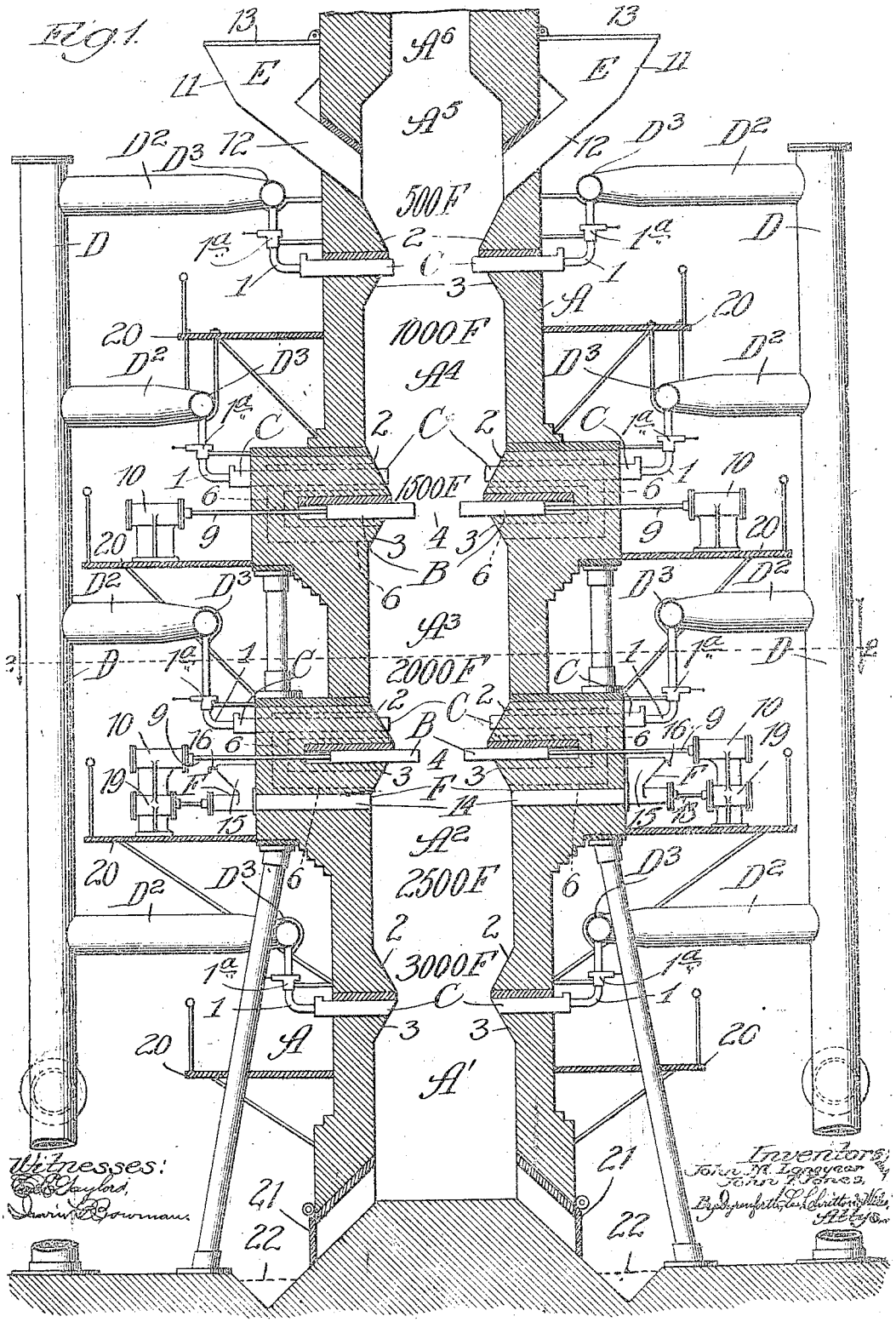

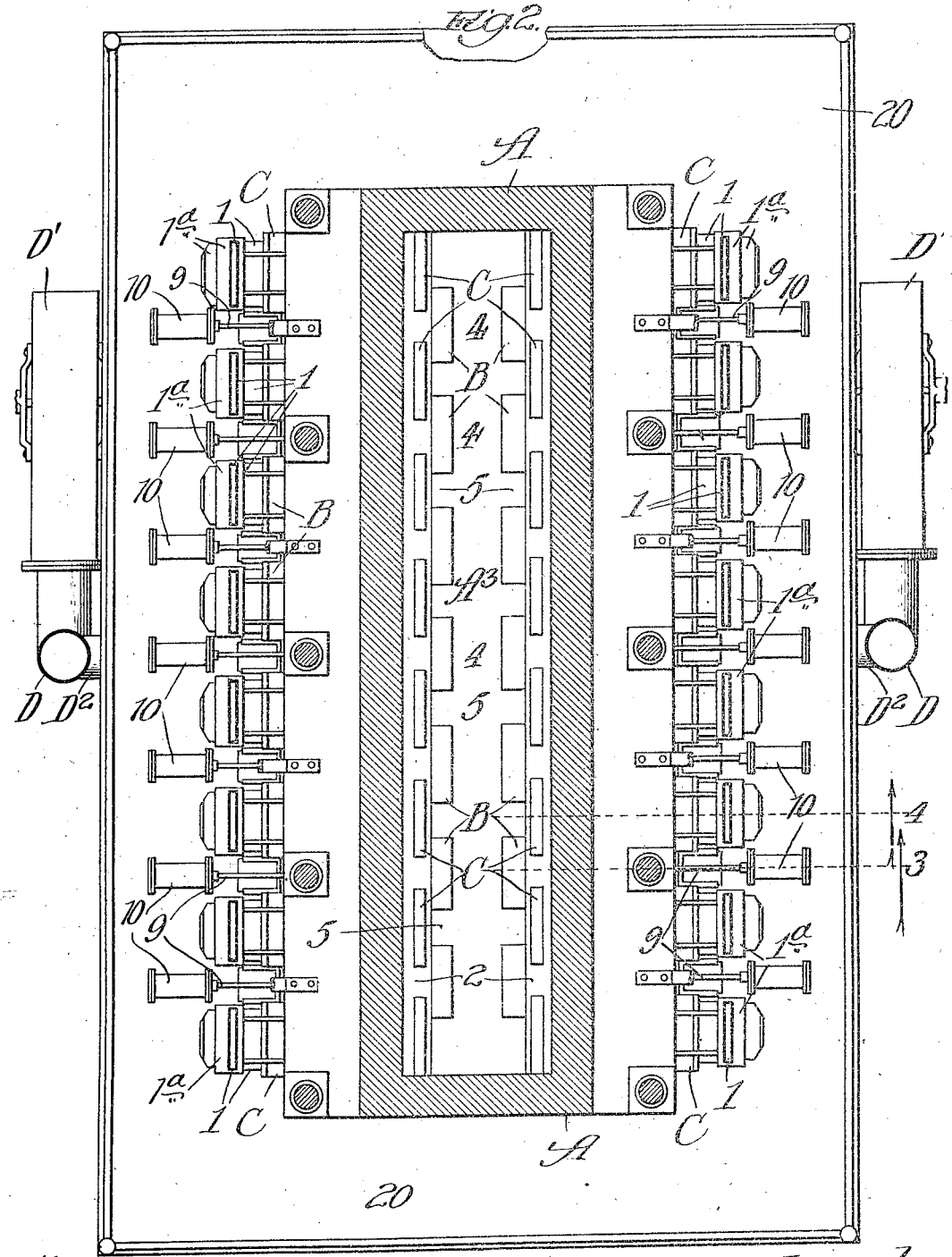

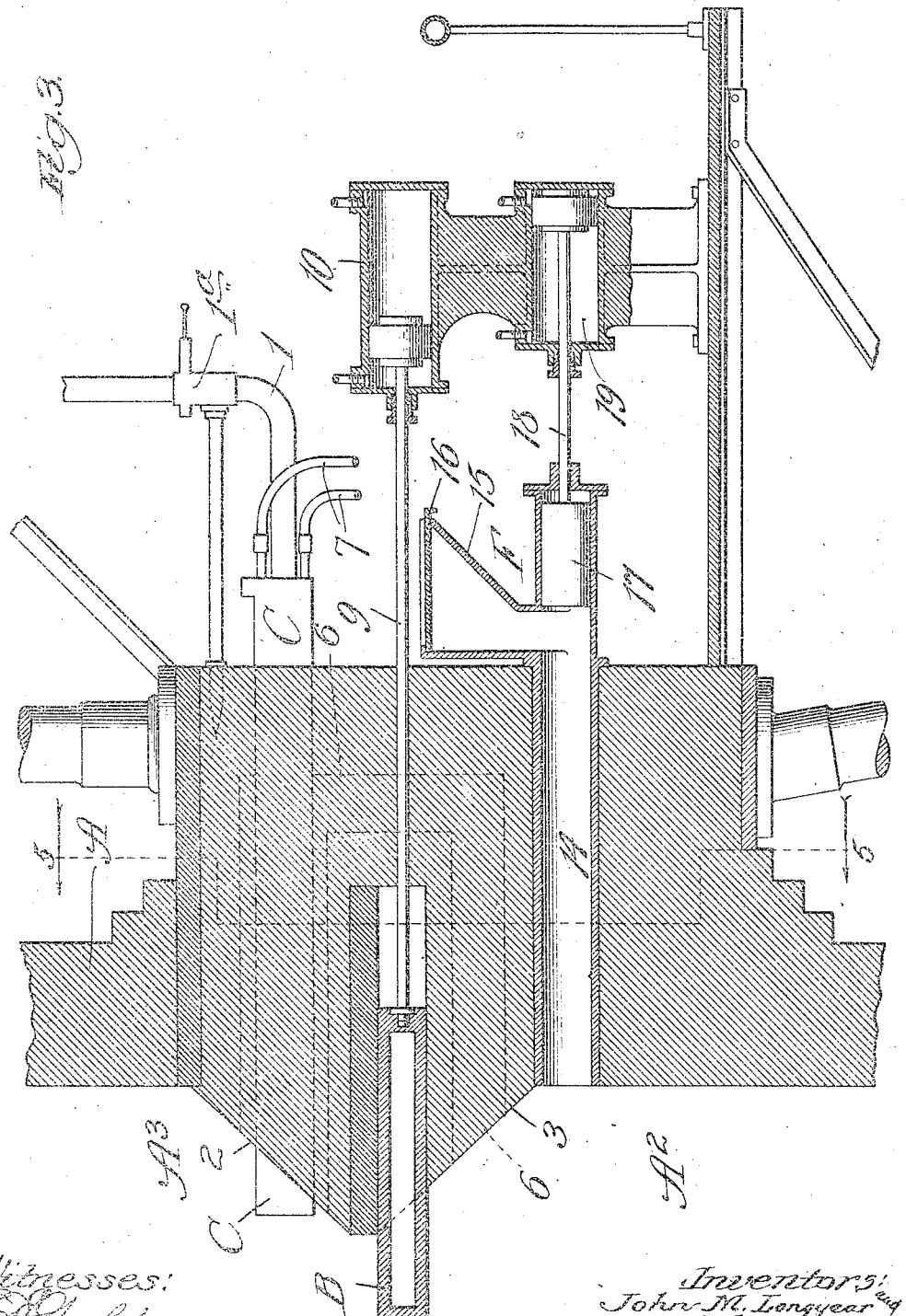

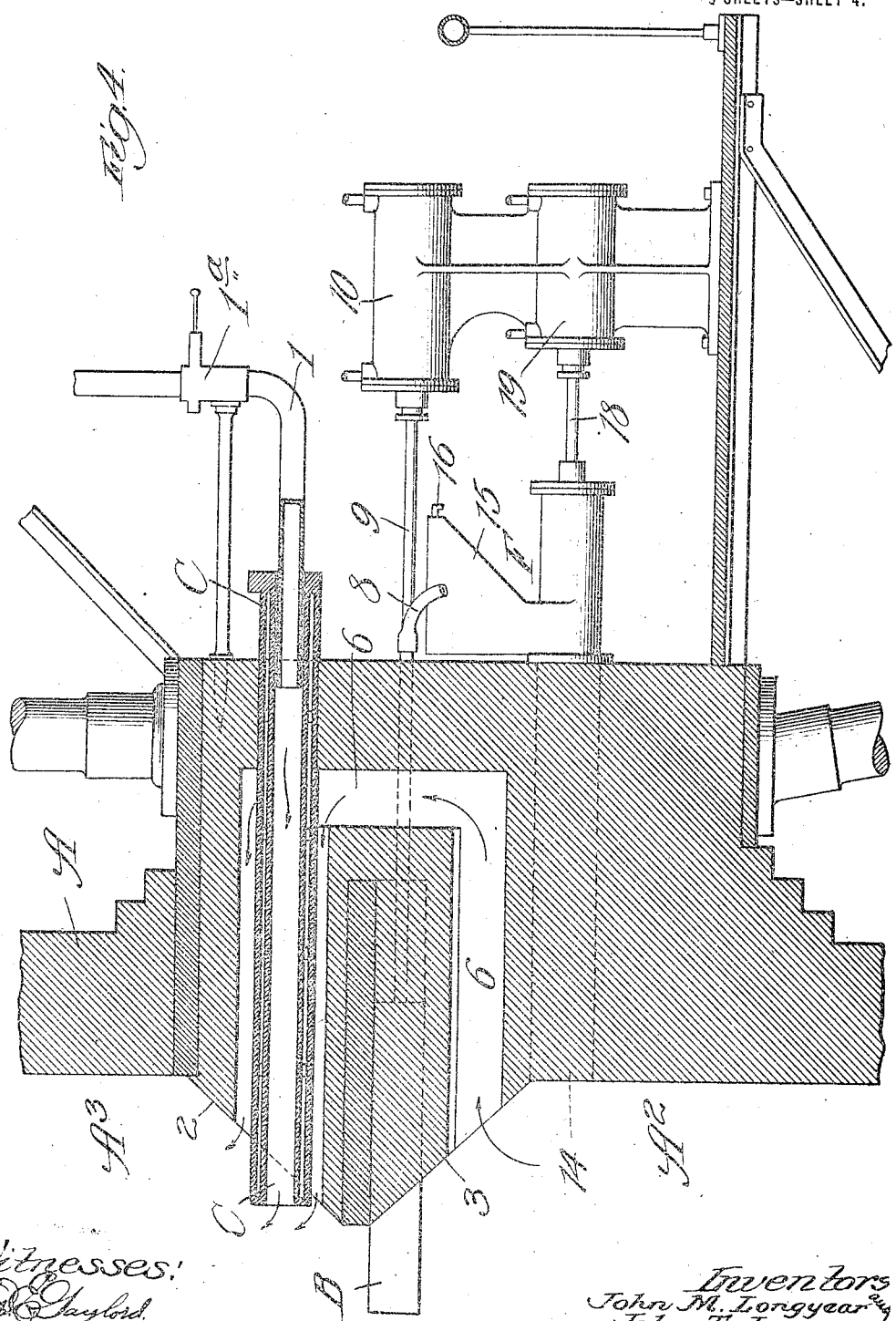

UNITED STATES PATENT OFFICE.

JOHN M. LONGYEAR AND JOHN T. JONES, OF MARQUETTE, MICHIGAN, ASSIGNORS TO NEW METALS-PROCESS COMPANY, OF CHICAGO, ILLINOIS, A CORPORATION OF ILLINOIS.

ORE-REDUCING APPARATUS AND PROCESS.

1,289,835.

Specification of Letters Patent.

Patented Dec. 31, 1918.

Application filed February 28, 1915, Serial No. 9,890. Renewed November 2, 1918. Serial No. 260,915.

*To all whom it may concern:*

Be it known that we, JOHN M. LONGYEAR and JOHN T. JONES, citizens of the United States, residing at Marquette, in the county of Marquette and State of Michigan, have invented a new and useful Ore-Reducing Apparatus and Process, of which the following is a specification.

This invention relates particularly to the recovery of metals by a bathless process, constituting an improvement upon the process set forth in the application of Albert G. Jones, No. 827,358, filed March 26, 1914.

The primary object is to provide improved apparatus for metallizing metal oxids and carbonates, such as iron oxids, copper oxids, silver oxids, manganese oxids, and the like.

A further object is to provide an improved method of metallizing ores, which can be advantageously practised by means of the improved apparatus herein described.

The improved apparatus is illustrated in the drawings, in which—

Figure 1 represents a broken, vertical, sectional view of an ore-reducing furnace constructed in accordance with the invention; Fig. 2, a plan-section taken as indicated at line 2 of Fig. 1; Fig. 3, an enlarged, broken, vertical, sectional view taken as indicated at line 3 of Fig. 2, this view showing one of the burden-supporting valves or slides employed, and a device for charging fresh solid fuel into the de-oxidizing chamber employed; Fig. 4, an enlarged broken, vertical section taken as indicated at line 4 of Fig. 2, this view showing a detail of one of the lateral flues or by-passes for gas with which the furnace is equipped, and showing also one of the twyers; Fig. 5, a broken, vertical section taken as indicated at line 5 of Fig. 3; Fig. 6, a broken plan view of one of the rectangular twyers and the air-admission pipe with which the same is adjustably connected; and Fig. 7, a broken view, partly in section, of one of the withdrawable burden-supporting members or slides employed.

In the construction illustrated, A represents a furnace comprising a lower chamber or soaking-pit A', a superposed de-oxidizing chamber $A^2$, a series of superposed pre-heating chambers $A^3$, $A^4$ and $A^5$, and a stack or chimney $A^6$; B, B, burden-supporting valves or slides projecting into the furnace at different levels and adapted to support the burden in sections, the members B being provided with suitable actuating means, whereby they may be withdrawn when desired, to allow the burden-section to descend; C, C, a series of air-twyers arranged at different levels and adapted to supply air to the several burden-sections contained in the de-oxidizing chamber and the superposed pre-heating chambers; D, D, standpipes which may contain air under small pressure, the air being supplied by a blower or air-compressor D'; $D^2$, $D^2$, a series of laterals leading from the stand-pipes D and communicating with horizontal pipes $D^3$ which serve to supply air, through pipes 1, to the twyers C, the pipes 1 being equipped with valves or air-regulating devices $1^a$; E, E, means for feeding distilled solid fuel (coke or charcoal) and ore-portions substantially isolated therein into the uppermost pre-heating chamber; and F, F, means for feeding fresh solid fuel adapted to supply hydrogen and carbo-hydrates, such as coal or wood, directly into the de-oxidizing chamber $A^2$.

The furnace A may be of any suitable construction and of any desired form. It is preferred to make the furnace of rectangular cross-section and of comparatively narrow internal width, say of a width of four to eight feet. The longer horizontal dimension may be as large as desired, depending upon the desired capacity of the plant. The furnace walls should be substantially of a character to prevent undue radiation of heat, and the walls of the de-oxidizing chamber $A^2$, particularly, should be capable of withstanding high temperatures. It is preferred to provide, at the junctions of the chambers mentioned, inward projections bounded by sloping upper walls 2 and undercut lower walls 3, thus contracting the internal area of the furnace at the junction-plane between the several chambers. Thus, the burden-sections which compose the stack of materials filling the furnace are given independent support, tending to prevent compacting of the burden and crushing of the coke or charcoal, and avoiding obstruction of the draft through the stack of materials. The supporting action of the internal shoulders is supplemented, at the junction-planes above and below the lowermost pre-heating chamber $A^3$ by the withdrawable supporting-members or slides B. Because of the nature of the burden which will be used in the furnace, the slides B may be separated by spaces 4, which will permit upward passage of the gases without preventing the slides from serving to effectually support the burden-sections. As appears form Fig. 2, the slides B may be separated also in the direction of the horizontal length of the furnace by spaces 5, thus supplementing the space available for the upward passage of the gases at the contracted points of the furnace. If desired, by-passes or flues 6 may also be provided in the furnace-walls at the enlarged portions thereof to enable gases to pass around the slides or burden-supports B.

As will be understood from Figs. 4 and 6, the twyers C, which are preferably adjustable through the walls of the furnace, are water-cooled by water supplied through pipes 7. The slides B may also be cooled by water supplied through pipes 8. The slides are shown provided with actuating rods 9 which connect with pistons contained in cylinders 10.

The means E for charging a mixture of distilled solid fuel and ore into the upper part of the furnace may be any desired means. As shown, the means comprises hoppers 11 which discharge their contents through chutes 12 into the chamber $A^5$. The hoppers 11 are shown provided with closures 13. The devices E may be regarded as a conventional illustration of any suitable means for effecting the purpose.

The devices F for charging fresh solid fuel directly into the de-oxidizing chamber $A^2$ may comprise any suitable means. In the form illustrated (Fig. 3) a chute 14 extends through the wall of the furnace and is supplied from a hopper 15 equipped with a closure 16. A plunger 17 works in the chute 14, being actuated by a rod 18 connected with a piston confined in a cylinder 19. The furnace is shown provided with a series of platforms 20 arranged at convenient levels to enable the operation of the furnace to be carried on.

Assuming the furnace to be in operation, the furnace contains a series of superposed burden-sections which are independently supported by the sloping walls 2 and the supplemental burden-supports or valves B, which are adapted to be withdrawn, from time to time, to permit the stack of materials to settle down as materials are withdrawn from the base of the stack. In the normal operation of the furnace, distilled solid fuel (coke or charcoal) containing a relatively small amount of ore practically isolated therein, is introduced through the hoppers E, to keep the top of the burden at or near the level of the lower ends of the chutes 12. The ore, if hard, is preferably preparatorily crushed to a size of one inch or smaller; and in the practice of the process, a large preponderance of the solid fuel is maintained in all of the chambers of the furnace.

As an illustration, in dealing with a high-grade iron-ore, the materials may be used in the proportions of 400 pounds of coke, 100 pounds of bituminous coal, and 250 pounds of ore, the fuel having approximately twice the weight of the ore, and being approximately five times as large in volume as the ore. If wood and charcoal are used in place of coal and coke, the disparity in volume is much greater. For illustration, with 2240 pounds of ore, one may use 96 cubic feet of charcoal and 32 cubic feet of wood. The proportions may be varied to gain the best and most economical results. In any case, it is preferred to use the fuel mainly in comparatively large lump or block form, although this is not indispensable. As will be explained, the coke (or charcoal) is used over and over again, being gradually reduced in size, but being constantly replenished by freshly formed coke (or charcoal) when the process is carried on in the preferred manner. Thus, a relatively small amount of fresh solid fuel adapted to supply hydrogen and hydro-carbons is introduced directly into the de-oxidizing chamber $A^2$, thus furnishing gases which are of great value in reducing the metal oxids, and at the same time serving to replenish the stack of distilled solid fuel.

Air is introduced and burned within the burden-section in the de-oxidizing chamber $A^2$ in limited quantity, but sufficient to produce in the main de-oxidizing chamber a high-temperature de-oxidizing medium and a metal-fixing zone. Air is supplied to the pre-heating chambers in limited quantities and in such manner as to gradually decrease the temperatures as the upper end of the furnace is approached. The temperature in the lower portion of the de-oxidizing chamber $A^2$ should be in excess of 2000° F. for iron, and 3000° F. is ordinarily ample for any ore. Much depends upon the character of the ore, however; and with lean ores containing some natural flux, too high a temperature is preferably avoided. The operation is preferably so balanced that a temperature scale will be produced in the furnace somewhat as indicated on Fig. 1. It is to be observed that carbon dioxid will be formed in the vicinity of the lower twyers and a zone of intense heat will be established there. The gases change to carbon monoxid as they rise in the chamber $A^2$ and come in contact with the highly heated carbon. The carbon monoxid, in turn, robs the ore of its oxygen. A general de-oxidizing medium is maintained at high temperature in the chamber $A^2$, however, and a rapid interchange of oxygen occurs, the completion of the metallizing operation and fixing of the metals being performed mainly in the chamber A². As the materials settle down in the soaking-chamber A', where a de-oxidizing medium is also maintained, any metal oxids which can be reached by the gases before the temperature drops too low will be converted to metal. Finally, the materials will be cooled in the lower portion of the chamber A' and may be discharged through doors 21 into a water-bath 22. Any suitable provision for removing the unconsumed fuel, gangue and metals in solid form, may be substituted for the means shown.

Areas of intensified heat will be established at the inner ends of the twyers which supply the pre-heating chambers, but the heat in said zones will be of successively reduced intensity, and the solid fuel will be attached less and less as the upper end of the furnace is approached. When the furnace is properly balanced in its operation, by controlling the air-supplies introduced at the several levels, the result will be to burn the combustible gases in the upper portion of the furnace in intimate contact with the freshly introduced distilled solid fuel and ore, thereby pre-heating the ore, without substantially attacking the solid fuel in the upper portion of the furnace. Finally, the gases, after complete combustion, will pass upwardly through the chimney of the furnace.

The present invention constitutes a modification of the invention described and claimed in our application No. 9889 filed of even date herewith. In the practice of the process, more or less metallizing occurs during the passage of the ore and fuel through the pre-heating chambers, especially through the chamber A³, where quite a high temperature is maintained; but, as stated, the main metallizing operation occurs in the chamber A², where such a high temperature is maintained as to enable a most rapid interchange of oxygen to occur, and the agglomerating and fixing of the metals occurs in the vicinity of the inner ends of the lowermost series of twyers. After removal of the unconsumed solid fuel, gangue and metals in solid form from the lower end of the stack, separation may be effected in any desired manner; and the unconsumed fuel may be re-charged, mixed with ore, into the upper portion of the furnace. As the materials are removed from the bottom of the stack, the valves B are withdrawn or opened, from time to time, to permit the burden-sections to settle down to lower levels, and thus each portion of the burden passes through, first, a distinct pre-heating operation, and then a gradual de-oxidizing action upon the ores as the portion of the burden approaches the high temperature which is most suitable for the rapid interchange of oxygen; and finally, the metallization is completed and the fixing of the metals effected during the passage through the de-oxidizing chamber A².

In practice, the method of feeding materials to the furnace may be varied, according to conditions. If green or wet wood be used for fuel, it may be fed in at a higher level, so that the water will be driven off before the wood reaches a lower and hotter zone. In such case, the wood will be thoroughly dried and somewhat charred during the pre-heating, the volatile hydro-carbons being mainly liberated at a lower level where they can be utilized most effectively. In some cases, it may be desirable to feed all or a large portion of the fuel in at lower level than that at which the ore is fed. Much will depend upon the character of the ore and the solid fuel used. In any event, it will be necessary to maintain sufficient interstitial passages for the air and gases through the burden; and it will be necessary to maintain a large preponderance of solid fuel in the lower, hotter zone.

The foregoing detailed description has been given for clearness of understanding only, and no unnecessary limitation should be understood therefrom, but the appended claims should be construed as broadly as permissible in view of the prior art. It is our intention to claim all of our invention as it may exist in view of the prior art.

What we regard as new and desire to secure by Letters Patent is—

1. An ore-reducing furnace comprising a plurality of superposed chambers adapted to contain burden-sections in superposed relation, movable burden-supporting devices adapted to support the burden in sections, actuating means therefor, and means for introducing limited air-supply into the burden under such conditions as to produce a deoxidizing atmosphere.

2. An ore-reducing furnace comprising a plurality of superposed chambers adapted to contain the burden in sections, movable burden-supporting devices arranged at a plurality of levels and extending into the furnace, actuating means for said devices, and twyers arranged at a plurality of levels and adapted to introduce limited air-supplies into the burden-sections under such conditions as to produce a deoxidizing atmosphere.

3. An ore-reducing furnace comprising a plurality of superposed chambers with contracted passages at their junction-planes, movable burden-supporting devices associated with the contracted passages, actuating means for said devices, and means for introducing air into the burden-sections at a plurality of levels.

4. An ore-reducing furnace comprising walls having inward projections at a series of levels dividing the furnace into a plurality of superposed chambers, movable burden-section supports extending into the furnace shaft and associated with said inward projections of the furnace walls, actuating means for said supports, a plurality of series of twyers arranged at a plurality of levels and adapted to supply air in limited quantities to the burden-sections, and means for removing unconsumed solid fuel, gangue, and metals in solid form from the bottom of the furnace.

5. An ore-reducing furnace comprising walls having inward projections at a plurality of levels affording sloping surfaces and adapted to afford partial support for a series of superposed burden-sections contained in the furnace, movable burden-section supports extending into the furnace beyond the inward projections of the walls, without closing the passages between the several chambers, actuating means for said movable burden-supports, twyers arranged at a plurality of levels and adapted to supply air to the burden-sections, means for supplying air in regulable quantities to said twyers, and means for removing unconsumed solid fuel, gangue, and metals in solid form from the lower portion of the furnace.

6. In an ore-reducing furnace, the combination of a plurality of superposed chambers adapted to contain superposed burden-sections, movable burden-supports at the junction-planes of some of said chambers, actuating means for said burden-supports, twyers adapted to supply air in regulable quantities to the interior of the furnace under such conditions as to produce a deoxidizing atmosphere, means at the upper portion of the furnace for charging solid fuel and ore-portions isolated therein into the furnace, and means for removing unconsumed solid fuel, gangue, and metals in solid form from the lower portion of the furnace.

7. In an ore-reducing furnace, the combination of a plurality of superposed chambers with contracted walls at the junction-planes of the chambers, movable burden-supports projecting into the furnace-shaft at the junction-planes between some of said chambers, means for supplying distilled solid fuel and ore to the upper portion of the furnace, means for charging fresh solid fuel into a lower chamber of the furnace, and means for supplying air to the interior of the furnace at a plurality of levels.

8. In an ore-reducing furnace, the combination of a soaking-pit provided at its lower portion with means for the removal of unconsumed fuel, gangue, and metal in solid form, a superposed de-oxidizing chamber, a plurality of superposed pre-heating chambers, movable burden-supports extending into the shaft of the furnace at a plurality of levels, actuating means therefor, twyers extending into the shaft of the furnace at a plurality of levels, and means for supplying air in regulable quantities to said twyers, said twyers and air-supplying means being constructed and arranged to supply air under such conditions as to provide a deoxidizing atmosphere generally in the furnace.

9. In an ore-reducing furnace, the combination with the end walls thereof, of side walls provided at a plurality of levels with inward projections serving to contract the internal area of the furnace-shaft and divide the furnace into a plurality of superposed chambers, a plurality of series of twyers extending through the side walls at a plurality of levels and associated with the inward projections of the side walls, movable burden-supports associated with some of the inward projections of the side walls, actuating means for the movable burden-supports, and means for charging solid fuel and ore into the upper portion of the furnace.

10. In an ore-reducing furnace, the combination of a shaft having its walls provided at a plurality of levels with inward projections, thus dividing the shaft into a series of superposed chambers adapted to contain burden-sections in superposed relation, movable burden-supports projecting into the shaft at some of the planes of contracted area, by-pass flues in the walls adapted to conduct gases past the movable burden-supports, and a plurality of series of twyers adapted to supply air to the interior of the furnace at a plurality of levels.

11. In an ore-reducing furnace of substantially rectangular form, the combination with the end walls thereof, of side walls provided at a plurality of levels with inward projections, a plurality of series of twyers disposed at a plurality of levels and extending through the side walls, means for supplying air in regulable quantities to said twyers, a series of movable burden-supports arranged in the side walls of the furnace and spaced a short distance from each other in a horizontal direction, actuating means for the movable burden-supports, and means for introducing solid fuel and ore into the upper portion of the furnace.

12. The bathless process of recovering metals, which consists in independently supporting, in superposed relation, burden-sections composed at the lower level of solid fuel and ore-portions substantially isolated therein; burning a limited amount of air within a lower burden-section under conditions to produce therein a high-temperature de-oxidizing medium and metal fixing zone; passing the de-oxidizing gas into an upper burden-section and burning it with limited air-supply introduced at a higher level; withdrawing materials as solids from the bottom of the stack; dropping the burden-sections periodically to successively lower planes; and charging a replenishing mixture of solid fuel and ore into the upper portion of the furnace.

13. The bathless process of recovering metals, which consists in supporting burden-sections in superposed relation in such manner as practically to wholly relieve a lower burden-section from the pressure of the upper burden-sections; burning a limited quantity of air in the lower burden-section under conditions to produce a high-temperature de-oxidizing medium and a metal-fixing zone; passing the de-oxidizing gas upwardly through the upper burden-sections; supplying air in limited quantities to the upper burden-sections, so regulated as to burn the combustible gases in the upper portion of the burden without substantially attacking the solid fuel; removing the unconsumed solid fuel, gangue, and metals in solid form from the lower portion of the stack; periodically dropping the upper burden-sections to lower levels to cause them to progressively pass through the high-temperature de-oxidizing medium and metal-fixing zone; and supplying a replenishing mixture of solid fuel and ore-portions contained therein to the upper end of the stack of materials undergoing treatment.

JOHN M. LONGYEAR.
JOHN T. JONES.

In the presence of—
ALBERT G. JONES,
E. W. JONES.